UNITED STATES PATENT OFFICE.

KARL KREKELER AND AUGUST BLANK, OF ELBERFELD, GERMANY, ASSIGNORS TO THE FARBENFABRIKEN OF ELBERFELD COMPANY, OF NEW YORK, N. Y.

BLUE-BLACK TRISAZO DYE.

SPECIFICATION forming part of Letters Patent No. 602,855, dated April 26, 1898.

Application filed November 4, 1897. Serial No. 657,313. (Specimens.)

*To all whom it may concern:*

Be it known that we, KARL KREKELER and AUGUST BLANK, doctors of philosophy, subjects of the German Emperor, residing at Elberfeld, Germany, (assignors to the FARBENFABRIKEN OF ELBERFELD COMPANY, of New York,) have invented a new and useful Improvement in the Manufacture of Trisazo Dyes; and we do hereby declare the following to be an exact and full description of our invention.

Our invention relates to the production of a new class of trisazo dyestuffs by combining in an alkaline solution one molecule of a tetrazotized paradiamin—such as benzidin, tolidin, dianisidin, or the like—with one molecule of amidonaphtholsulfo-acid G or of salts thereof, rediazotizing the resulting intermediate product, and, finally, coupling the tetrazo compound thus obtained with two molecules of alpha$_1$ alpha$_4$ dioxynaphthalene alpha$_2$ monosulfo-acid or of salts thereof. The products thus obtained are sodium salts of acids having the following general formula:

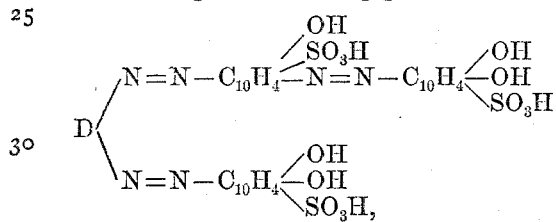

(D representing in this formula the radical of one of the paradiamins above mentioned—such as diphenyl, ditolyl, or the like.) The new products represent when dry and pulverized dark powders which dissolve in water with a blue color and dye unmordanted cotton blue shades, which after treatment with solutions of chromium and copper salts change into blackish blue.

In carrying out our process practically we can proceed as follows: 21.2 kilos, by weight, of tolidin are diazotized in the usual manner by means of sixty kilos, by weight, of a thirty-per-cent. hydrochloric acid and fourteen kilos, by weight, of sodium nitrite, keeping the temperature at zero. To the resulting solution first a cold solution of twenty-two kilos, by weight, of sodium carbonate (Na$_2$CO$_3$) and then a solution prepared by dissolving twenty-four kilos, by weight, of amidonaphtholmonosulfo-acid G and seven kilos, by weight, of sodium carbonate (Na$_2$CO$_3$) in three hundred liters of hot water and subsequent cooling is added, with stirring, an intermediate product being thus produced which separates in the shape of a black precipitate. To the resulting mixture seventy-five kilos, by weight, of a thirty-per-cent. hydrochloric acid and 7.5 kilos, by weight, of sodium nitrite, dissolved in a suitable quantity of water, are added, with stirring, in order to diazotize the free amido group contained in the molecules of the intermediate product. The reaction mixture is subsequently allowed to stand for some hours and is then poured, with stirring, into a solution prepared from fifty kilos, by weight, of alpha$_1$ alpha$_4$ dioxynaphthalene alpha$_2$ sulfonate of sodium, seventy kilos, by weight, of sodium acetate, and fifteen hundred liters of water, which solution has been weakly acidulated by means of acetic acid. The resulting mixture is further stirred for about twelve hours in order to complete the formation of the dyestuff and finally rendered weakly alkaline by means of thirty kilos, by weight, of sodium carbonate, (Na$_2$CO$_3$,) the finished coloring-matter being thus precipitated. It is filtered, dried, and pulverized. It is the sodium salt of an acid having the structural formula

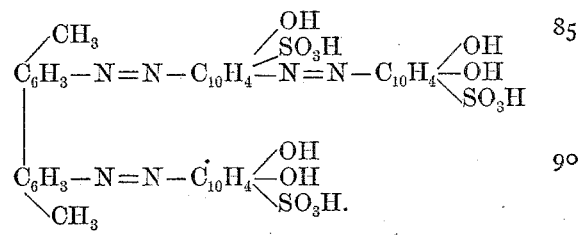

The same dyestuff can also be produced in another manner—viz., by combining the intermediate product obtained from equimolecular proportions of tetrazoditolyl and of amidonaphtholsulfo-acid G with one molecule of the dioxynaphthalenesulfo-acid, (in an acetic-acid solution,) further diazotizing the tetrazo coloring-matter thus obtained, and finally coupling the resulting diazo compound with the second molecule of the dioxynaphthalene-sulfo-acid.

The new dyestuff obtained in one of the above-described manners represents, when dry and pulverized, a dark powder with a bronze-like luster. It dissolves in water with a blue color, in a twenty-per-cent. ammonia liquor with a violet color, and is insoluble in alcohol and in concentrated hydrochloric acid. By concentrated sulfuric acid it is dissolved with a greenish-blue color, from which solution a blue flaky precipitate is obtained on the addition of ice. After reducing the dyestuff—for instance, by means of stannous chlorid—in a concentrated hydrochloric-acid solution tolidin and a diamidonaphtholsulfo-acid can be easily isolated from the reaction mixture.

Our new coloring-matter dyes unmordanted cotton blue shades, which are fast to acids and to alkalies. By treating the fabric thus dyed with solutions of chromium and copper salts fast blackish-blue shades are obtained.

Having now described our invention and in what manner the same is to be performed, what we claim as new, and desire to secure by Letters Patent, is—

1. The process for producing new trisazo dyestuffs by first combining in an alkaline solution one molecule of a tetrazotized paradiamin, such as benzidin, tolidin, dianisidin, with one molecule of amidonaphtholsulfo-acid G, secondly rediazotizing the resulting intermediate product and finally coupling the intermediate product thus obtained with two molecules of $alpha_1\ alpha_4$ dioxynaphthalene $alpha_2$ monosulfo-acid, substantially as described.

2. The process for producing a new trisazo dyestuff by first coupling equimolecular proportions of a tetrazoditolyl salt and of amidonaphtholsulfo-acid G, secondly diazotizing the intermediate product thus obtained and finally combining the resulting tetrazo body with two molecules of $alpha_1\ alpha_4$ dioxynaphthalene $alpha_2$ sulfo-acid, substantially as described.

3. As new articles of manufacture the new trisazo dyestuffs derived from the diazotized intermediate product from one molecule of a tetrazotized paradiamin, such as benzidin, tolidin, dianisidin, with one molecule of amidonaphtholsulfo-acid G by combination with two molecules of $alpha_1\ alpha_4$ dioxynaphthalene $alpha_2$ monosulfo-acid, representing dark powders, dissolving in water with a blue color, dyeing unmordanted cotton blue shades which when treated with solutions of chromium and copper salts change into blackish blue; substantially as described.

4. As a new article of manufacture the specific dyestuff derived from the diazotized intermediate product from tetrazoditolyl and amidonaphtholsulfo-acid G by combination with two molecules of $alpha_1\ alpha_4$ dioxynaphthalene $alpha_2$ monosulfo-acid, being an alkaline salt of the acid of the formula

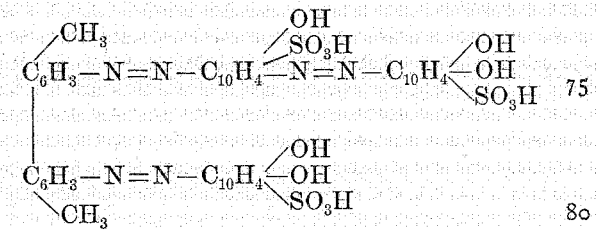

representing a dark powder with a bronze-like luster, dissolving in water with a blue color, in concentrated sulfuric acid with a greenish-blue color yielding on reduction with stannous chlorid in a hydrochloric-acid solution a mixture of reduction products from which tolidin and a diamidonaphtholsulfo-acid can easily be isolated, substantially as described.

In testimony whereof we have signed our names in the presence of two subscribing witnesses.

KARL KREKELER.
AUGUST BLANK.

Witnesses:
R. E. JAHN,
OTTO KÖNIG.